US011388118B2

(12) United States Patent
Li et al.

(10) Patent No.: US 11,388,118 B2
(45) Date of Patent: Jul. 12, 2022

(54) TRANSMISSION OF A MESSAGE BASED ON A DETERMINED COGNITIVE CONTEXT

(71) Applicant: International Business Machines Corporation, Armonk, NY (US)

(72) Inventors: Pan Li, Beijing (CN); Ting Cao, Beijing (CN); Jian Dong Yin, Beijing (CN); Zi Jian Ji, Beijing (CN); He Li, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 210 days.

(21) Appl. No.: 15/976,899

(22) Filed: May 11, 2018

(65) Prior Publication Data
US 2019/0349322 A1    Nov. 14, 2019

(51) Int. Cl.
*H04L 51/043* (2022.01)
*H04L 51/214* (2022.01)

(52) U.S. Cl.
CPC .......... *H04L 51/043* (2013.01); *H04L 51/214* (2022.05)

(58) Field of Classification Search
CPC .............................. H04L 51/14; H04L 51/043
USPC ...................................................... 709/206
See application file for complete search history.

(56) References Cited

U.S. PATENT DOCUMENTS

| 6,636,965 | B1 * | 10/2003 | Beyda ................. | H04L 63/0428 709/206 |
| 7,461,378 | B2 | 12/2008 | Beyda | |
| 7,653,543 | B1 * | 1/2010 | Blair ....................... | G10L 17/26 704/224 |
| 8,086,672 | B2 * | 12/2011 | Horvitz ................. | G06F 15/173 709/224 |
| 8,370,756 | B2 | 2/2013 | Malik et al. | |
| 8,751,594 | B2 | 6/2014 | Aceves | |
| 2007/0041394 | A1 * | 2/2007 | Schafer .................. | H04L 51/30 370/432 |
| 2007/0239830 | A1 | 10/2007 | Barnes et al. | |
| 2008/0228888 | A1 * | 9/2008 | Orozco ................... | H04L 51/04 709/206 |
| 2009/0018958 | A1 * | 1/2009 | Aveyard ................. | G06F 9/541 705/43 |
| 2009/0099848 | A1 | 4/2009 | Lerner et al. | |
| 2010/0299399 | A1 * | 11/2010 | Wanser ................ | G06Q 10/107 709/206 |
| 2016/0203123 | A1 * | 7/2016 | Kozloski .............. | G06Q 50/265 704/224 |

(Continued)

OTHER PUBLICATIONS

Weiner, Jochen et al. "Manual and Automatic Transcriptions in Dementia Detection from Speech." Proc. Interspeech 2017 (2017): 3117-3121.

*Primary Examiner* — Anh Nguyen
*Assistant Examiner* — John Fan
(74) *Attorney, Agent, or Firm* — Cantor Colburn LLP; Alexander Jochym

(57) ABSTRACT

Embodiments of the invention are directed to a computer-implemented method that includes determining, by a controller of a messaging system, a cognitive context of a message sender. The method also includes configuring at least one property of a message based on the determined cognitive context. The message is transmitted by the message sender to a first receiver. The method also includes transmitting the message to a second receiver based on the at least one configured property.

8 Claims, 7 Drawing Sheets

(56) References Cited

U.S. PATENT DOCUMENTS

| | | | |
|---|---|---|---|
| 2016/0226562 A1* | 8/2016 | Li | H04B 7/024 |
| 2016/0262613 A1 | 9/2016 | Klin et al. | |
| 2016/0379127 A1* | 12/2016 | Childress | G06Q 10/107 |
| | | | 706/11 |
| 2017/0208027 A1* | 7/2017 | Goldstein | H04L 51/26 |

* cited by examiner

| MESSAGE PROPERTY | SAMPLE CONTEXT | DESCRIPTION |
|---|---|---|
| 210 SENDER | someone@cn.ibm.com | WHO SEND THE MESSAGE |
| 220 RECEIVER | helen@cn.ibm.com | WHO RECEIVE THE MESSAGE |
| 230 MESSAGE BODY | HI HELEN, THE DATA WE WILL SHOW TO CLIENT IN HALF AN HOUR IS NOT CORRECT, PLEASE FIX IT ASAP | MESSAGE INFORMATION |
| 240 READ STATUS | NOT | DOES THE RECEIVER ALREADY READ THE MESSAGE OR NOT? |
| 250 NEED REPLY | YES | DOES RECEIVER MUST REPLY THIS MESSAGE OR NOT? |
| 260 REPLY TIME LIMITATION | 60 SECONDS | RECEIVER SHOULD REPLY THE MESSAGE WITHIN THE TIME LIMITATION, OTHERWISE, THE MESSAGE WILL LOSE EFFICACY? |
| 270 TRANSMISSIBLE | YES | CAN THE MESSAGE BE FORWARDED TO ANOTHER RECEIVER? |
| 280 MAX DELEGATION TIMES | 3 TIMES | IF TARGET RECEIVER HAS NO RESPONSE, AT MOST 3 DELEGATED RECEIVERS CAN BE CHOSEN OUT |

FIG. 2

TRANSMISSION OF A MESSAGE BASED ON A DETERMINED COGNITIVE CONTEXT

BACKGROUND

The present invention relates in general to transmitting a message based at least on a determined cognitive context of a sender of the message. More specifically, the present invention relates to computer systems that are configured to automatically transmit messages.

Messaging generally relates to transmitting textual communication between at least two parties. One type of messaging can be instant messaging, which corresponds to transmitting real-time textual communication over a network. A sender of an instant message can send the instant message to a single recipient or to multiple recipients. Instant messaging systems can enable a user to communicate with peers that are included on the user's contact list.

SUMMARY

A computer-implemented method according to one or more embodiments of the invention includes determining, by a controller of a messaging system, a cognitive context of a message sender. The method also includes configuring at least one property of a message based on the determined cognitive context. The message is transmitted by the message sender to a first receiver. The method also includes transmitting the message to a second receiver based on the at least one configured property.

A computer system according to one or more embodiments of the invention includes a memory and a processor system communicatively coupled to the memory. The processor system is configured to perform a method including determining a cognitive context of a message sender. The method also includes configuring at least one property of a message based on the determined cognitive context. The message is transmitted by the message sender to a first receiver. The method also includes transmitting the message to a second receiver based on the at least one configured property.

A computer program product according to one or more embodiments of the invention includes a computer-readable storage medium having program instructions embodied therewith. The program instructions are readable by a processor system to cause the processor system to determine a cognitive context of a message sender. The processor system is also caused to configure at least one property of a message based on the determined cognitive context. The message is transmitted by the message sender to a first receiver. The processor system is also configured to transmit the message to a second receiver based on the at least one configured property.

BRIEF DESCRIPTION OF THE DRAWINGS

The subject matter of one or more embodiments is particularly pointed out and distinctly defined in the claims at the conclusion of the specification. The foregoing and other features and advantages are apparent from the following detailed description taken in conjunction with the accompanying drawings in which:

FIG. 2 illustrates configured properties of a message that is to be transmitted in accordance with one or more embodiments of the invention;

DETAILED DESCRIPTION

Figure 1:
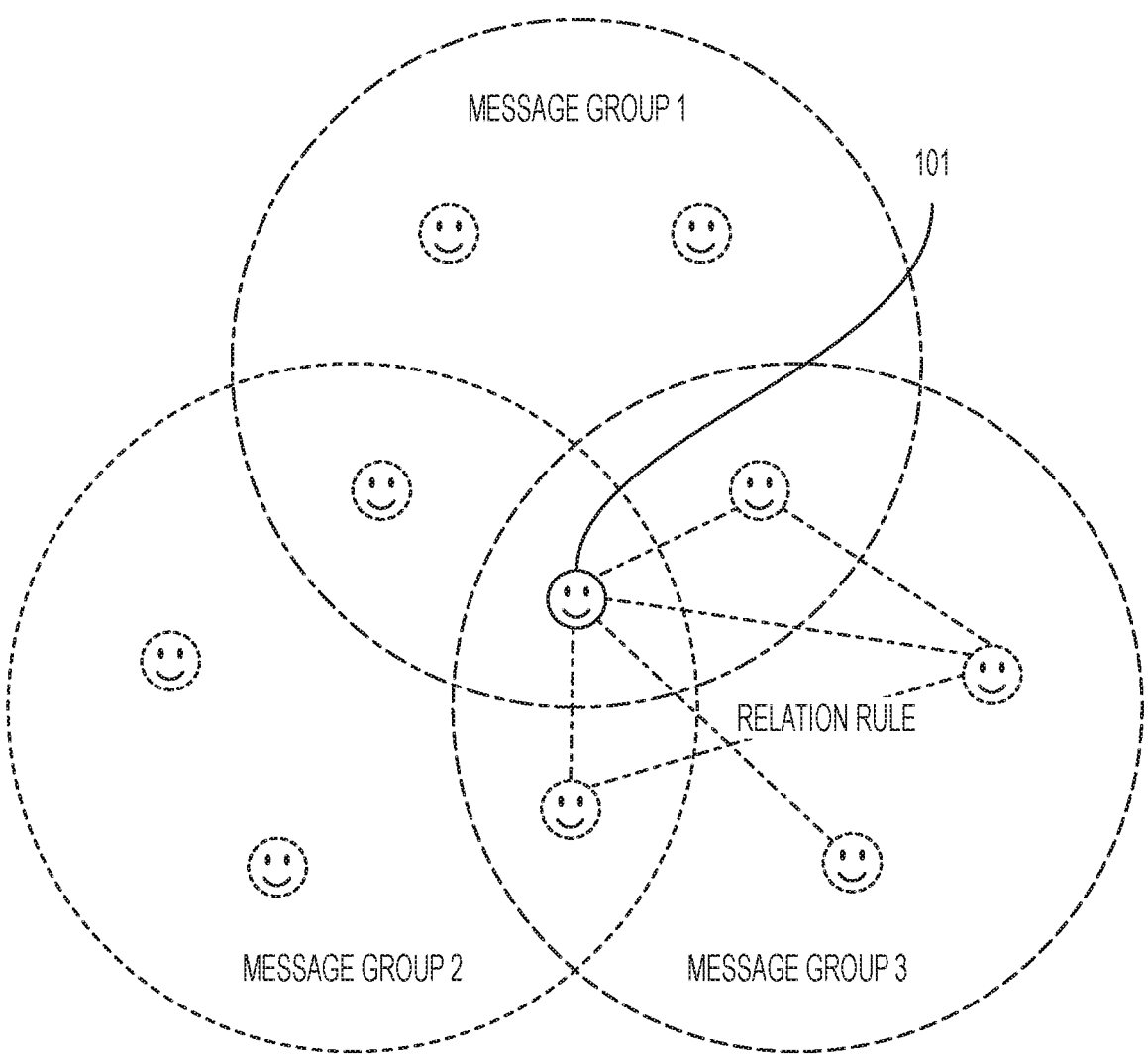
FIG. 1 illustrates a plurality of message groups that have been established by a user of a social network application in accordance with one or more embodiments of the invention.

Various embodiments of the invention are described herein with reference to the related drawings. Alternative embodiments of the invention can be devised without departing from the scope of this invention. References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments of the invention whether or not explicitly described.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments of the invention or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

For the sake of brevity, conventional techniques related to computer processing systems and computing models may or may not be described in detail herein. Moreover, it is understood that the various tasks and process steps described herein can be incorporated into a more comprehensive procedure, process or system having additional steps or functionality not described in detail herein.

One or more embodiments of the invention are directed to a method and system that automatically transmits a message based on a determined cognitive context of a sender of the message. Specifically, one or more embodiments of the invention can configure properties of the message and can automatically transmit the message within a messaging network based on the configured properties. The message can be an instant message that is transmitted within an instant messaging network, for example. With conventional messaging platforms, when the sender transmits a message, the message is typically transmitted only a single time through the messaging platform/network. However, because the sender's message is only transmitted a single time, and because the intended receiver typically needs to receive the transmitted message via a receiving device, the intended receiver can miss receiving the message if the message is transmitted when the receiving device is temporarily outside of a receiving range. Also, the intended receiver can miss receiving the transmitted message if the message is transmitted when the intended receiver's receiving device does not have sufficient battery power to properly receive the transmitted message. Thus, with the conventional approaches, the intended receiver can miss receiving the sender's message in a timely manner. Also, with the conventional approaches, if the sender needs the intended receiver to respond to the transmitted message, the sender may not receive a timely response from the intended receiver if the intended receiver has not yet received the message or if the intended receiver is preoccupied with other matters. Further, with the conventional approaches, if a sender transmits to a group of receivers in order to ensure that the message is received by at least one of the receivers, then the sender can possibly intrude upon certain receivers who do not need to or do not want to receive the message.

In contrast to the conventional approaches, one or more embodiments of the invention can perform automatic transmission of messages based on a determined cognitive context, and thus one or more embodiments of the invention can more readily transmit messages to a relevant receiver. Also, with one or more embodiments of the invention, a sender that transmits a message can more readily receive a response from a relevant receiver of the transmitted message. Further, messages that are transmitted in accordance with one or more embodiments of the invention can be less intrusive upon a group of receivers of the messages, where at least some of the receivers do not need to receive the messages.

With one or more embodiments of the invention, a computer-implemented system can determine the cognitive context of the message sender. For example, the computer-implemented system can determine an intended receiver of the message, peers of the message sender, the intent/purpose of the sender in transmitting the message, a requested response for the message, and/or possible receivers that can supply a requested response to the message.

One or more embodiments of the invention can determine the cognitive context of the message sender by operating in conjunction with a social media application that is used by the message sender. Specifically, as the sender establishes a social network of peers using the social media application, one or more embodiments can determine possible receivers for the sender's message based on the peers of the sender, as described in more detail below. Therefore, one or more embodiments of the invention can determine possible receivers of a message even if these possible receivers were not originally designated as the intended recipient of the message.

With one or more embodiments of the invention, the established social network of a message sender can be defined by relational rules that are established between the message sender and different peers. The relational rule for each peer can define whether the peer is a trusted individual that is permitted to receive messages from the message sender. The relational rules can thus define the receivers who are able to receive the message. Further, the relational rules can also define the receivers who are permitted to retransmit the message on behalf of the message sender, if necessary. The relational rules can also define the receivers that can respond to the message.

One or more embodiments of the invention can configure one or more properties of the message based on the determined cognitive context, where the message is then transmitted in accordance with the corresponding configured properties. The configured properties of a message can define: (1) an amount of time that is allotted to a receiver of the message before the message is automatically transmitted to an alternate, subsequent receiver, (2) whether or not the message is permitted to be automatically transmitted to an alternate, subsequent receiver, (3) a number of times that the message can be transmitted to alternate, subsequent receivers, (4) a number of alternate, subsequent receivers that are eligible to receive the message, and/or (5) whether the message requires a response, for example.

With one or more embodiments of the invention, when a message sender transmits a message, the message sender can also transmit the configured properties of the message. The configured properties can be appended to the message that the configured properties correspond to. As such, once a receiver receives the message, the receiver can transmit/forward the message to an alternate, the subsequent receiver in accordance with the configured properties, if necessary.

The message sender that transmits the message to an intended receiver may need to receive a response from the receiver. With one or more embodiments of the invention, after the message is transmitted to the intended receiver, if the intended receiver does not respond to the sender within a specific allotted timeframe (as defined by the previously-described configured message properties), the transmitted message can be automatically transmitted/forwarded to another subsequent receiver. One or more embodiments of the invention can determine the subsequent receiver based on the configured properties, where the configured properties can be determined based on the determined cognitive context of the message sender. For example, the subsequent recipient can be an individual who has a relationship with the message sender as reflected by the sender's social network.

In the event that at least one receiver (i.e., the intended receiver or a subsequent receiver) provides a response to the sender, one or more embodiments of the invention can then notify the other receivers that they do not need to provide any response to the sender. The type of notification that is provided to each receiver can be based on whether the other receiver has actually read/accessed the message.

For example, when a message is transmitted by a sender to a plurality of receivers, and when one of the receivers provides a response to the message, one or more embodiments can notify the other receivers who received the message that they do not need to take any further action with regard to the message. One or more embodiments of the invention can withdraw the message from receivers who have not yet accessed/opened the message. Alternatively, one or more embodiments of the invention can provide a notification to receivers who have not yet read the message, where the notification indicates to these receivers that the message no longer requires a response.

FIG. 1 illustrates a plurality of message groups that have been established by a user 101 of a social network application in accordance with one or more embodiments of the invention. In the example of FIG. 1, a user 101 has established three message groups including Message Group 1, Message Group 2, and Message Group 3, for example. Each message group defines a group of peers, where user 101 has established a relationship with each of the peers. In the example of FIG. 1, user 101 belongs to each of the message groups. In Message Group 3, user 101 has established relationships between four other members. The established relationships, which can each be expressed as a relation rule, can define possible receivers for messages that are transmitted by user 101. For example, Message Group 3 can define a group of peers (of user 101) who are authorized to receive a message that is transmitted by user 101. With one or more embodiments, if user 101 sends a message to an intended recipient, and if the intended recipient does not provide a response to the message, then the message can be forwarded to a member of Message Group 3. Therefore, in order to determine whether an individual belongs in Message Group 3, one or more embodiments determine whether the individual meets the relationship rule of being authorized to receive a message that is transmitted by user 101. In other words, a trust relationship exists between user 101 and each member of Message Group 3. As described above, other message groups can include other individuals who meet other types of relationship rules.

FIG. 2 illustrates configured properties of a message that is to be transmitted in accordance with one or more embodiments of the invention. As previously described, the configured properties can be determined based on a determined cognitive context of a message sender. In the example of FIG. 2, the configured properties of the message can include a sender 210, receiver 220, and message body 230 (i.e., a content/information of the message). Additionally, the configured properties can include a read status 240 that reflects whether or not the receiver has opened/accessed/read the message. Additionally, the transmitted message can include a timeframe 260 (i.e., a "reply time limitation") that corresponds to an amount of time that is allotted to the receiver to the respond to the message. As described in more detail below, if the receiver does not respond to the message from the sender within the allotted timeframe, then the message can be automatically forwarded/transmitted to one or more subsequent receivers. One or more embodiments of the invention can automatically forward/transmit the message based on a transmission configuration 270 (i.e., a "transmissible" property) that indicates whether the message can be forwarded to another receiver. With one or more embodiments of the invention, the configurations can also include a limit 280 (i.e., a "max delegation times" property) of how many subsequent receivers that the message can be forwarded/transmitted to.

Figure 3:
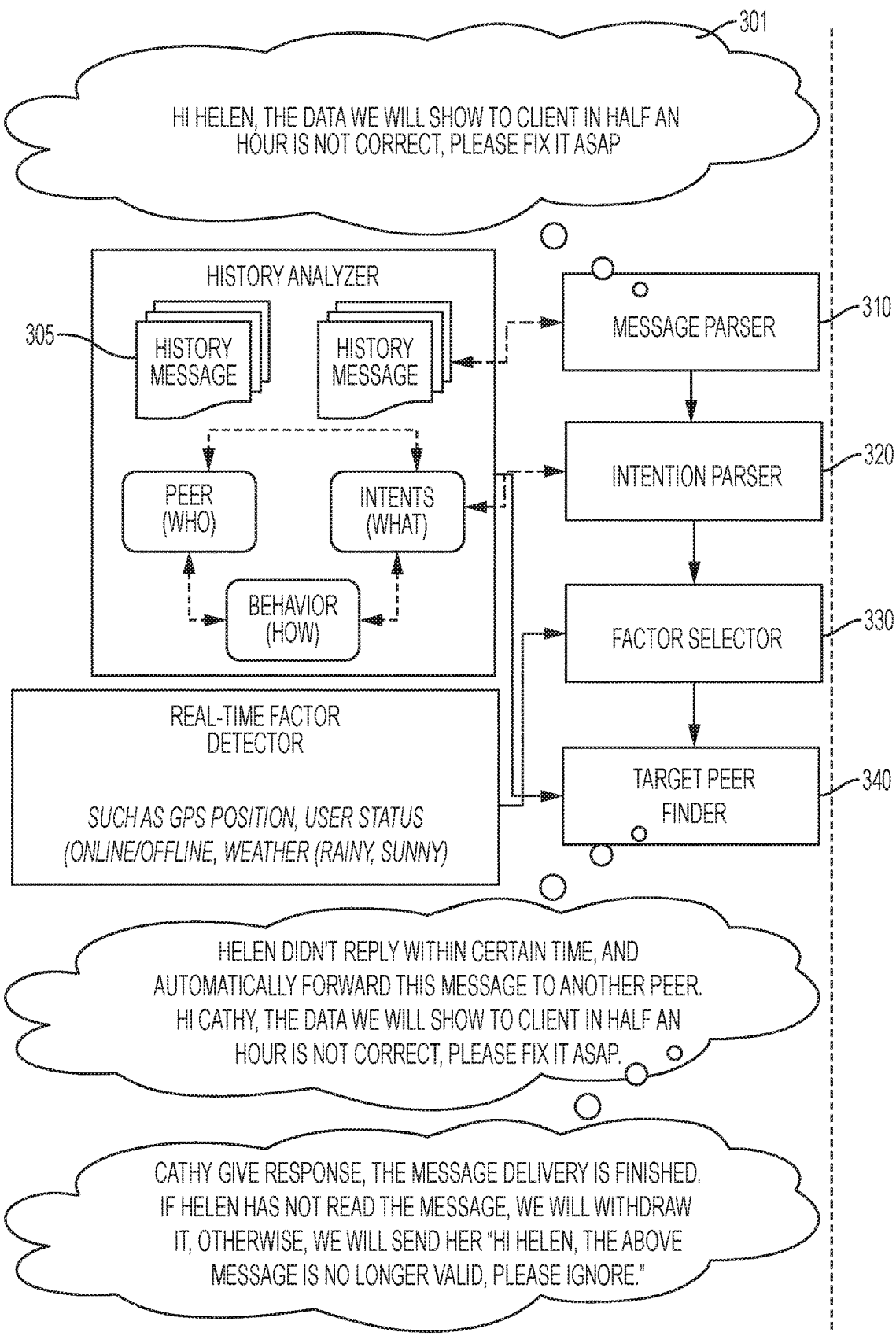
FIG. 3 illustrates a messaging system that performs automatic transmitting of a message based on a determined cognitive context in accordance with one or more embodiments of the invention.

FIG. 3 illustrates a messaging system that performs an automatic transmitting of a message 301 based on a determined cognitive context in accordance with one or more embodiments of the invention. The messaging system can be implemented using a neural processor, for example. In another embodiment, the messaging system can also be implemented using a workload-optimized system that integrates parallel processors. The messaging system can determine cognitive context information such as, for example, by inferring intent and sentiment information. With one or more embodiments of the invention, the messaging system can analyze a message in order to retrieve data relating to concepts, entities, relations, and/or semantic roles, for example. With one or more embodiments of the invention, the messaging system can perform natural language processing for analyzing text of the message. The messaging system can also use a machine-learning system to determine the cognitive context of the message sender. The machine-learning system can be based on, for example, one or more artificial neural networks (ANNs), which can use electronic components that mimic the processing architecture of the human brain. Artificial neural networks are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning.

The messaging system can operate in conjunction with a social network application that is used by the message sender. In the example of FIG. 3, a message parser 310 of the system can perform a historical analysis of historical messages 305. For example, the message parser 310 can determine possible subsequent receivers for the message 301 based on who the message sender historically communicated with in the past. The message parser 310 can also determine a possible subject matter for the message 301 based on the subject matter that the message sender has historically discussed in the past. In the example of FIG. 3, message parser 310 parses a message 301 that states, "Hi Helen, the data we will show to the client in half an hour is not correct, please fix it asap." Next, an intention parser 320 can receive input from the message parser 310 to determine the relevant parties (i.e., "peers") that the message has been transmitted to. The intention parser 320 can also determine an intent/content of the message. The intention parser 320 can also determine a requested action/behavior that is requested by the message 301. In the example of FIG. 3, a factor selector 330 can determine relevant real-time factors such as, for example, a global positioning system (GPS) location of an intended receiver and the location of possible receivers. For example, one or more embodiments of the invention can determine subsequent, alternative receivers based on a distance from the intended receiver. For example, one embodiment of the present invention can determine subsequent receivers that are located in close proximity to the intended receiver. One or more embodiments of the invention can also determine subsequent receivers based on these receivers' status (i.e., online/offline) on the messaging system. For example, one embodiment of the invention can determine subsequent receivers based on who is currently online. One or more embodiments of the invention can also determine subsequent receivers based on a weather condition that is being experienced by the receivers. For example, one embodiment of the invention can determine subsequent receivers that are not experiencing inclement weather.

Referring again to FIG. 3, if the intended receiver (i.e., "Helen") does not respond to the message, the target peer finder 340 can transmit the message to the subsequent receiver. In the example of FIG. 3, the target peer finder 340 transmits/forwards the message to "Cathy." Specifically, the messaging system can transmit a message to a different peer, while using the same determined intent and determined behavior. Next, suppose that the subsequent receiver ("Cathy") provides a response to the message. If the original intended receiver ("Helen") has not read the message, the messaging system can withdraw the message from the original intended receiver. On the other hand, if the original intended receiver has opened/read the message, then one or more embodiments of the invention can send a subsequent message to indicate to the original intended receiver that no additional action is necessary. A subsequent receiver can further forward the message to other receivers if permitted by the configurations of the message.

Figure 4:
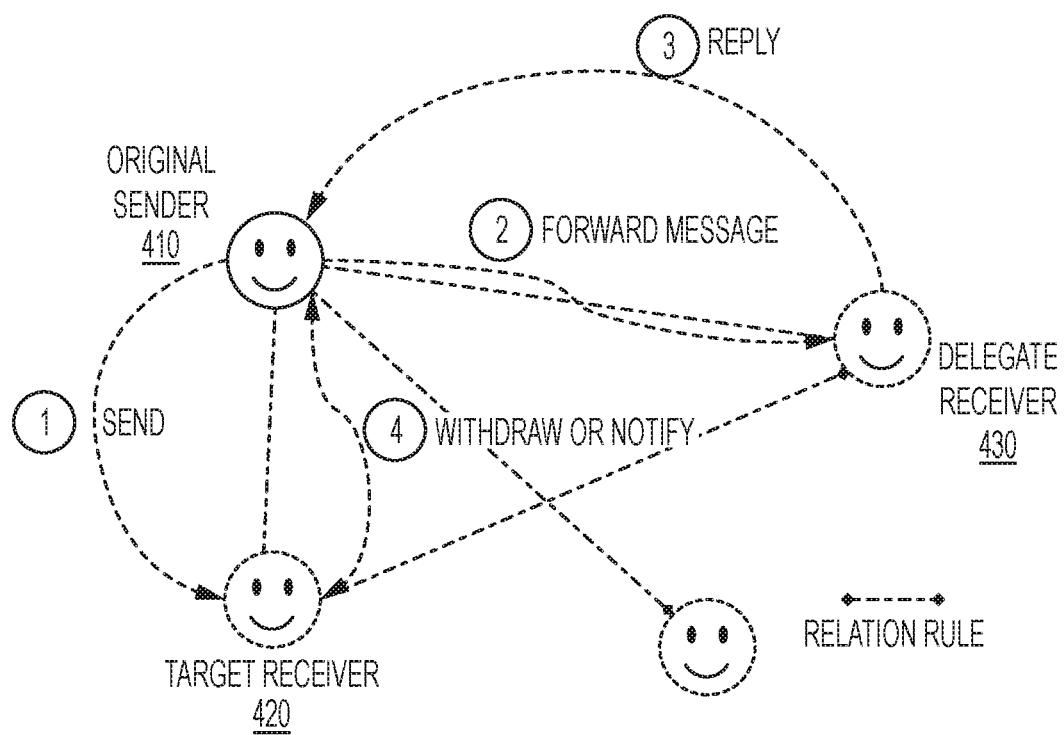
FIG. 4 illustrates a process of automatically transmitting a message based on a determined cognitive context in accordance with one or more embodiments of the invention.

FIG. 4 illustrates a process of automatically transmitting a message based on a determined cognitive context in accordance with one or more embodiments of the invention. In the example of FIG. 4, an original sender 410 can transmit a message to a target/intended receiver 420. In the example of FIG. 4, because the target/intended receiver 420 does not respond to the message within a designated timeframe (as defined by the configured properties of the message), one or more embodiments of the invention automatically transmits/forwards the message to a subsequent/delegate receiver 430. Because the subsequent/delegate receiver 430 replies to the transmitted message, the original sender 410 then withdraws the message from the original target/intended receiver 420 or notifies the original target/intended receiver 420 to disregard the message.

Figure 5:
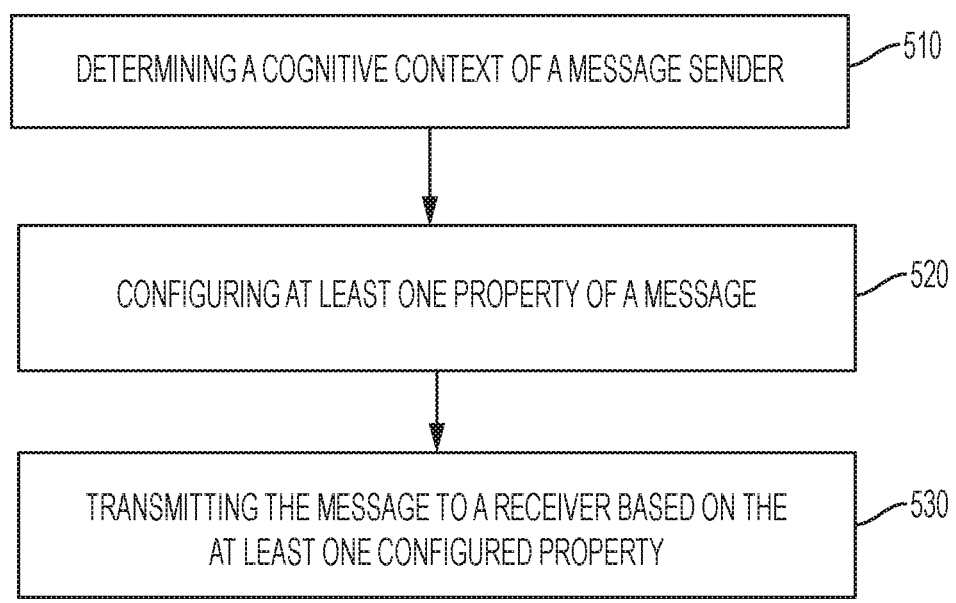
FIG. 5 depicts a flowchart of a method in accordance with one or more embodiments of the invention.

FIG. 5 depicts a flowchart of a method in accordance with one or more embodiments of the invention. The method of FIG. 5 can be performed by a controller of a system that is configured to send messages between different users. The method can be performed by a messaging system/application that operates in conjunction with a social network application.

The method includes, at block 510, determining, by a controller of a messaging system, a cognitive context of a message sender. The method also includes, at block 520, configuring at least one property of a message based on the determined cognitive context. The message is transmitted by the message sender to a first receiver. The method also includes, at block 530, transmitting the message to a second receiver based on the at least one configured property.

Figure 6:
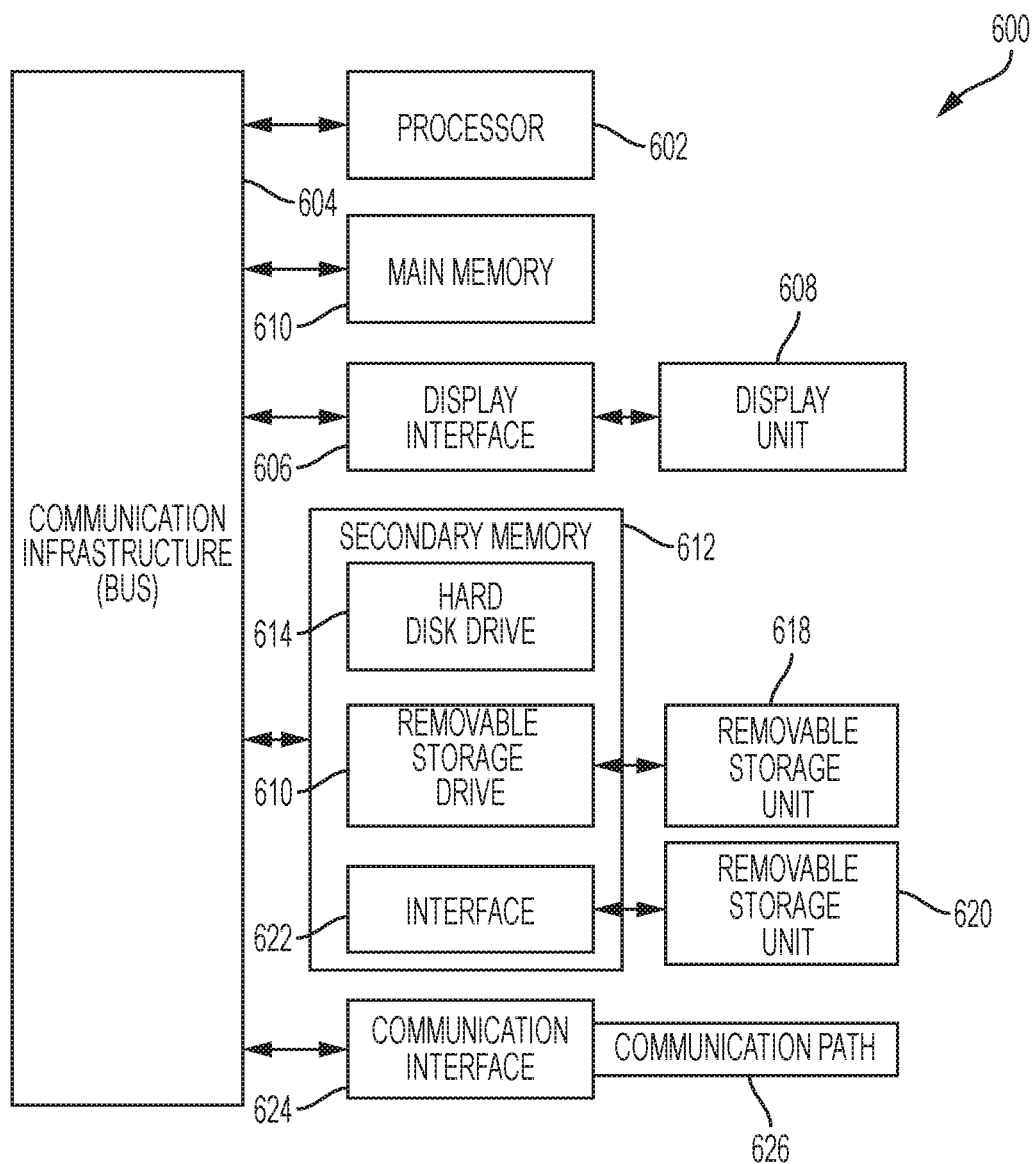
FIG. 6 depicts a high-level block diagram of a computer system, which can be used to implement one or more embodiments of the invention.

FIG. 6 depicts a high-level block diagram of a computer system 600, which can be used to implement one or more embodiments of the invention. Computer system 600 can correspond to or operate in conjunction with, at least, a messaging system, for example. Computer system 600 can be used to implement hardware components of systems capable of performing methods described herein. Although one exemplary computer system 600 is shown, computer system 600 includes a communication path 626, which connects computer system 600 to additional systems (not depicted) and can include one or more wide area networks (WANs) and/or local area networks (LANs) such as the Internet, intranet(s), and/or wireless communication network(s). Computer system 600 and additional system are in communication via communication path 626, e.g., to communicate data between them.

Computer system 600 includes one or more processors, such as processor 602. Processor 602 is connected to a communication infrastructure 604 (e.g., a communications bus, cross-over bar, or network). Computer system 600 can include a display interface 606 that forwards graphics, textual content, and other data from communication infrastructure 604 (or from a frame buffer not shown) for display on a display unit 608. Computer system 600 also includes a main memory 610, preferably random access memory (RAM), and can also include a secondary memory 612. Secondary memory 612 can include, for example, a hard disk drive 614 and/or a removable storage drive 616, representing, for example, a floppy disk drive, a magnetic tape drive, or an optical disc drive. Hard disk drive 614 can be in the form of a solid state drive (SSD), a traditional magnetic disk drive, or a hybrid of the two. There also can be more than one hard disk drive 614 contained within secondary memory 612. Removable storage drive 616 reads from and/or writes to a removable storage unit 618 in a manner well known to those having ordinary skill in the art. Removable storage unit 618 represents, for example, a floppy disk, a compact disc, a magnetic tape, or an optical disc, etc. which is read by and written to by removable storage drive 616. As will be appreciated, removable storage unit 618 includes a computer-readable medium having stored therein computer software and/or data.

In alternative embodiments of the invention, secondary memory 612 can include other similar means for allowing computer programs or other instructions to be loaded into the computer system. Such means can include, for example, a removable storage unit 620 and an interface 622. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 620 and interfaces 622 which allow software and data to be transferred from the removable storage unit 620 to computer system 600.

Computer system 600 can also include a communications interface 624. Communications interface 624 allows software and data to be transferred between the computer system and external devices. Examples of communications interface 624 can include a modem, a network interface (such as an Ethernet card), a communications port, or a PC card slot and card, a universal serial bus port (USB), and the like. Software and data transferred via communications interface 624 are in the form of signals that can be, for example, electronic, electromagnetic, optical, or other signals capable of being received by communications interface 624. These signals are provided to communications interface 624 via a communication path (i.e., channel) 626. Communication path 626 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 610 and secondary memory 612, removable storage drive 616, and a hard disk installed in hard disk drive 614. Computer programs (also called computer control logic) are stored in main memory 610 and/or secondary memory 612. Computer programs also can be received via communications interface 624. Such computer programs, when run, enable the computer system to perform the features discussed herein. In particular, the computer programs, when run, enable processor 602 to perform the features of the computer system. Accordingly, such computer programs represent controllers of the computer system. Thus it can be seen from the foregoing detailed description that one or more embodiments of the invention provide technical benefits and advantages.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

Figure 7:
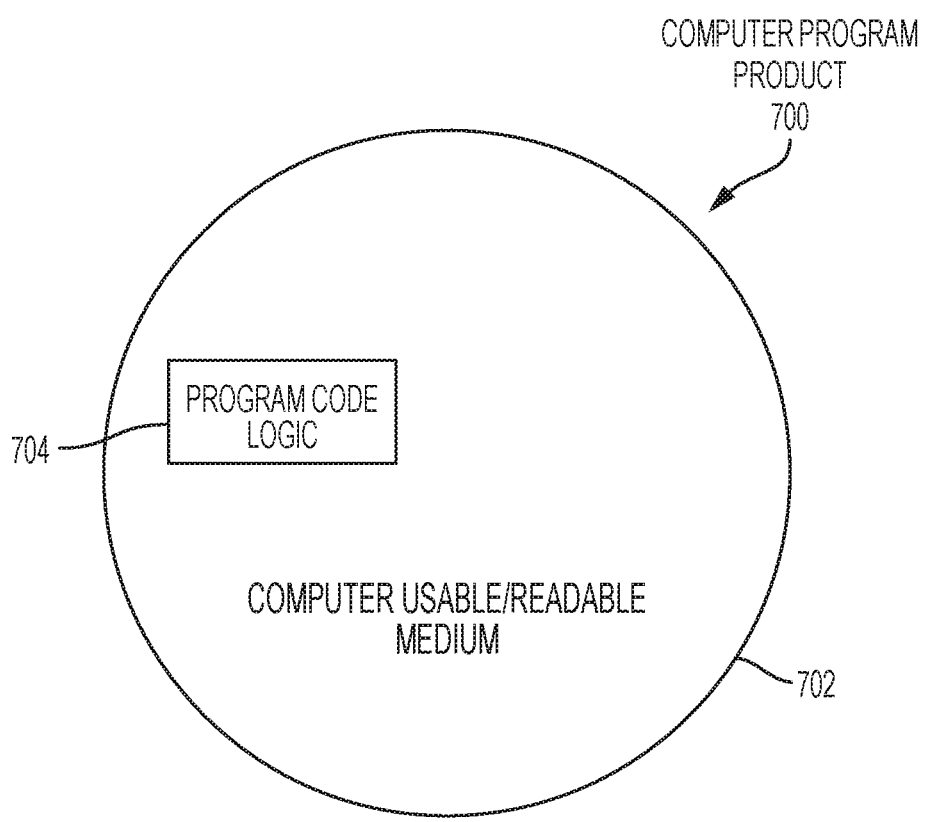
FIG. 7 depicts a computer program product, in accordance with an embodiment of the invention.

FIG. 7 depicts a computer program product 700, in accordance with an embodiment of the invention. Computer program product 700 includes a computer-readable storage medium 702 and program instructions 704.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments of the invention, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
determining, by a controller of a messaging system, a cognitive context of a message sender, wherein the messaging system corresponds to an instant messaging system;
configuring, by the controller of the messaging system, at least one property of a message based on the determined cognitive context of the message sender, wherein the message is transmitted by the message sender to a first receiver and the message requests a response from the first receiver;
transmitting, by the controller of the messaging system, the message to a second receiver based on the at least one configured property, wherein configuring the at least one property comprises configuring, by the controller of the messaging system based on the cognitive context of a message sender, an amount of time that is allotted to the first receiver of the message to respond to the message before the message is automatically transmitted to the second receiver, wherein transmitting the message to the second receiver requests that the second receiver provide the requested response; and
withdrawing the message from the first receiver based on a determination that a reply to the message has been received from the second receiver and that the message sender has not received the requested response from the first receiver in the amount of time, wherein transmitting the message to the second receiver comprises automatically transmitting the message to the second receiver based on the at least one configured property, and
wherein the at least one property of a message further includes a limit of how many subsequent receivers the message can be transmitted to, wherein the limit is determined by the controller of the messaging system based on the cognitive context of the message sender.

2. The computer-implemented method of claim 1, wherein determining the cognitive context of the message sender comprises determining at least one of an intended receiver of the message, peers of the message sender, an intent of the sender in transmitting the message, a requested response for the message, and possible receivers that can supply the requested response.

3. The computer-implemented method of claim 1, wherein transmitting the message to the second receiver comprises transmitting the message to an individual that meets a relationship rule of being authorized to receive the message from the message sender.

4. A computer system comprising:
a memory; and
a processor system communicatively coupled to the memory;
the processor system configured to perform a method comprising:
determining a cognitive context of a message sender;
configuring at least one property of a message based on the determined cognitive context of the message sender, wherein the processor system corresponds to a processor system of a messaging system, and the message is transmitted by the message sender to a first receiver and the message requests a response from the first receiver, wherein the messaging system corresponds to an instant messaging system;
transmitting the message to a second receiver based on the at least one configured property, wherein configuring the at least one property comprises configuring, by the controller of the messaging system based on the cognitive context of a message sender, an amount of time that is allotted to the first receiver of the message to respond to the message before the message is automatically transmitted to the second receiver, wherein transmitting the message to the second receiver requests that the second receiver provide the requested response; and
withdrawing the message from the first receiver based on a determination that a reply to the message has been received from the second receiver and that the message sender has not received the requested response from the first receiver in the amount of time, wherein transmitting the message to the second receiver comprises automatically transmitting the message to the second receiver based on the at least one configured property, and
wherein the at least one property of a message further includes a limit of how many subsequent receivers the message can be transmitted to, wherein the limit is determined by the controller of the messaging system based on the cognitive context of the message sender.

5. The computer system of claim 4, wherein determining the cognitive context of the message sender comprises determining at least one of an intended receiver of the message, peers of the message sender, an intent of the sender in transmitting the message, a requested response for the message, and possible receivers that can supply the requested response.

6. The computer system of claim 4, wherein transmitting the message to the second receiver comprises transmitting the message to an individual that meets a relationship rule of being authorized to receive the message from the message sender.

7. A computer program product comprising a computer-readable storage medium having program instructions embodied therewith, the program instructions readable by a processor system to cause the processor system to:
determine a cognitive context of a message sender;

configure at least one property of a message based on the determined cognitive context of the message sender, wherein the processor system corresponds to a processor system of a messaging system, and the message is transmitted by the message sender to a first receiver and the message requests a response from the first receiver, wherein the messaging system corresponds to an instant messaging system;

transmit the message to a second receiver based on the at least one configured property, wherein configuring the at least one property comprises configuring, by the controller of the messaging system based on the cognitive context of a message sender, an amount of time that is allotted to the first receiver of the message to respond to the message before the message is automatically transmitted to the second receiver, wherein transmitting the message to the second receiver requests that the second receiver provide the requested response; and withdraw the message from the first receiver based on a determination that a reply to the message has been received from the second receiver and that the message sender has not received the requested response from the first receiver in the amount of time, wherein transmitting the message to the second receiver comprises automatically transmitting the message to the second receiver based on the at least one configured property, and wherein the at least one property of a message further includes a limit of how many subsequent receivers the message can be transmitted to, wherein the limit is determined by the controller of the messaging system based on the cognitive context of the message sender.

8. The computer program product of claim 7, wherein determining the cognitive context of the message sender comprises determining at least one of an intended receiver of the message, peers of the message sender, an intent of the sender in transmitting the message, a requested response for the message, and possible receivers that can supply the requested response.

* * * * *